United States Patent [19]

Sokira

[11] Patent Number: 4,554,500
[45] Date of Patent: Nov. 19, 1985

[54] BATTERY CHARGING APPARATUS AND METHOD

[75] Inventor: Thomas J. Sokira, Cheshire, Conn.

[73] Assignee: Anton/Bauer, Inc., Shelton, Conn.

[21] Appl. No.: 480,746

[22] Filed: Mar. 31, 1983

[51] Int. Cl.$^4$ ............................................. H02J 7/04
[52] U.S. Cl. ...................................... 320/31; 320/21; 320/23; 320/35; 320/37
[58] Field of Search ................... 320/20, 21, 22–24, 320/35–38, 31, 39

[56] References Cited

U.S. PATENT DOCUMENTS

| | | | |
|---|---|---|---|
| 2,070,541 | 2/1937 | Beetem | 171/314 |
| 3,178,629 | 4/1965 | Saslow | 320/23 |
| 3,413,536 | 11/1968 | Webb | 320/17 |
| 3,487,284 | 12/1969 | Cady | 320/20 |
| 3,510,746 | 5/1970 | Furuishi et al. | 320/39 |
| 3,599,071 | 8/1971 | Lapuyade | 320/35 |
| 3,614,583 | 10/1971 | Burkett et al. | 320/5 |
| 3,617,851 | 11/1971 | DuPuy et al. | 320/22 |
| 3,735,233 | 5/1973 | Ringle | 320/24 |
| 3,767,995 | 10/1973 | Kaminski et al. | 320/22 |
| 3,809,993 | 5/1974 | Wheeler | 320/36 X |
| 3,848,173 | 11/1974 | Hase | 320/23 |
| 3,855,516 | 12/1974 | Fairchild | 320/22 |
| 3,864,617 | 2/1975 | Smith et al. | 320/23 |
| 3,867,681 | 3/1974 | Bishop et al. | 320/21 |
| 3,911,350 | 10/1975 | Swope | 320/22 |
| 3,917,990 | 11/1975 | Sherman, Jr. | 320/35 |
| 3,938,019 | 2/1976 | Schmitt et al. | 320/21 |
| 3,944,904 | 3/1976 | Hase | 320/23 |
| 3,959,707 | 5/1976 | Stephens | 320/39 |
| 3,963,976 | 6/1976 | Clark | 320/21 |
| 3,987,353 | 10/1976 | Macharg | 320/39 |
| 4,006,397 | 2/1977 | Catotti et al. | 320/31 |
| 4,016,473 | 4/1977 | Newman | 320/14 |
| 4,031,450 | 6/1977 | Hammel et al. | 320/23 |
| 4,035,709 | 7/1977 | Seider et al. | 320/23 |
| 4,061,956 | 12/1977 | Brown et al. | 320/22 |
| 4,087,733 | 5/1978 | Casagrande | 320/21 |
| 4,097,792 | 6/1978 | Calaway | 320/22 |
| 4,125,802 | 11/1978 | Godard | 320/35 |
| 4,136,310 | 1/1979 | Foster | 320/37 |
| 4,237,411 | 12/1980 | Köthe et al. | 320/21 |
| 4,270,080 | 5/1981 | Kostecki | 320/24 |
| 4,297,630 | 10/1981 | Mullersman | 320/37 X |
| 4,301,398 | 11/1981 | Johnson | 320/21 |
| 4,313,078 | 1/1982 | Bilsky et al. | 320/15 |
| 4,321,523 | 3/1982 | Hammel | 320/14 |
| 4,355,275 | 10/1982 | Anglin | 320/21 |

Primary Examiner—R. J. Hickey
Attorney, Agent, or Firm—Kenyon & Kenyon

[57] ABSTRACT

A battery charging apparatus and method is disclosed. The battery charger includes a programmable two level constant current source having an inhibit input. A clock signal is fed to counting stages which time out after a specified time, during which time the battery is charged with constant current. A temperature sensing circuit detects the temperature of the charging battery and will allow the battery to charge at a reduced rate for a longer time period if the temperature increases above a threshold level. Once the counting stages time out, the battery charger pulse charges the battery at the reduced current level, preferably at a 20% duty cycle, at relatively long intervals to keep the battery from self discharging.

25 Claims, 7 Drawing Figures

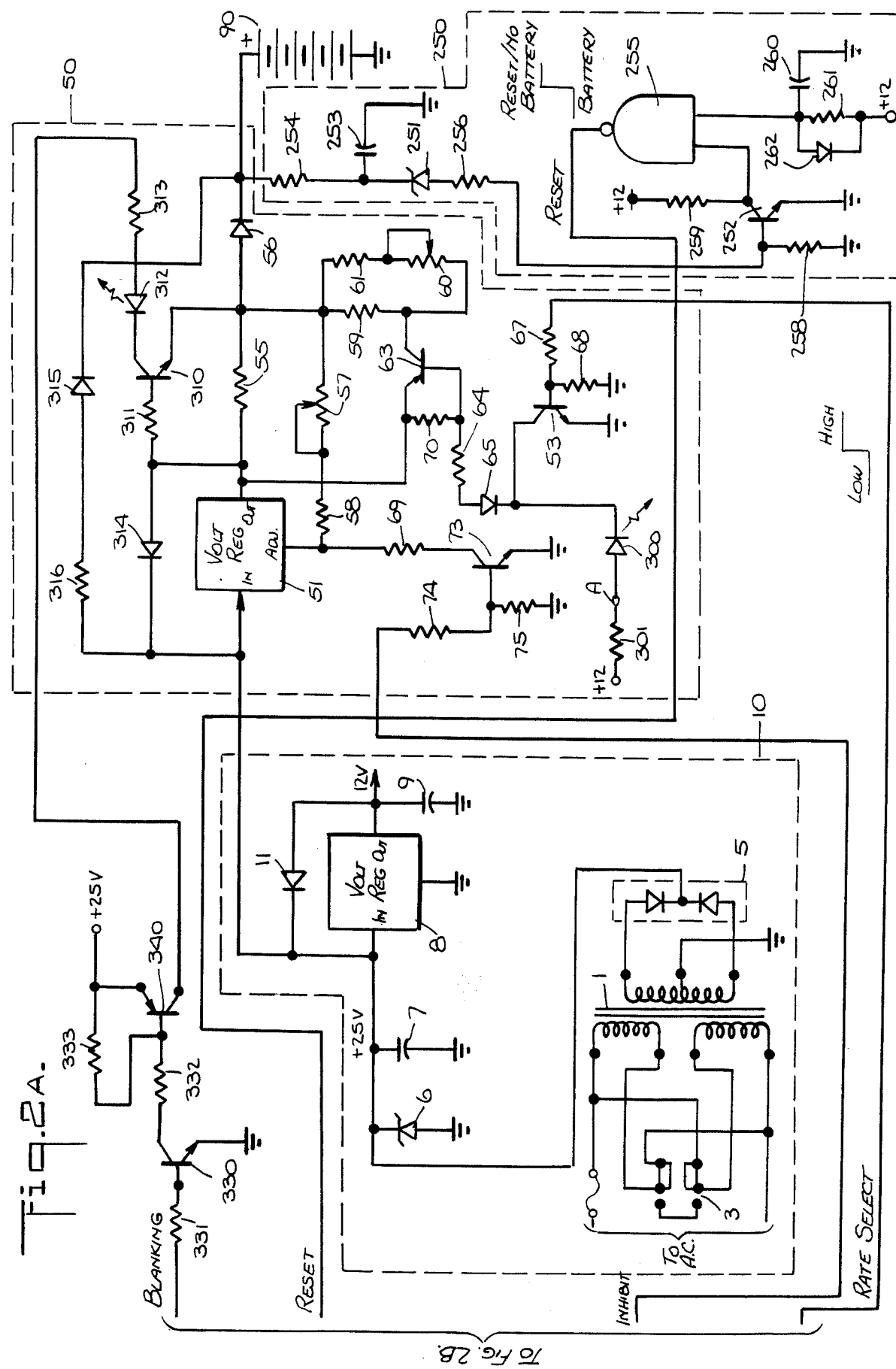

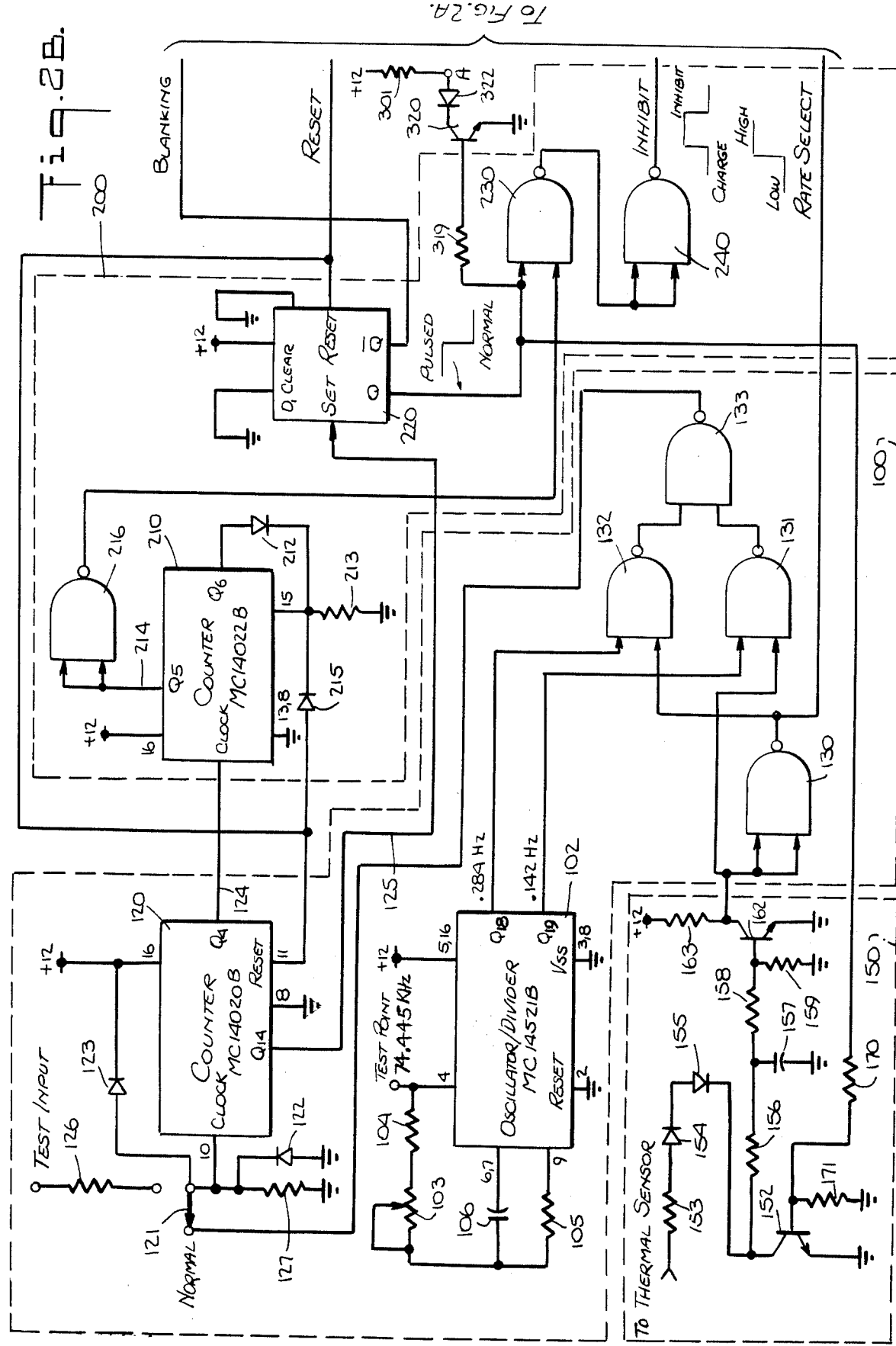

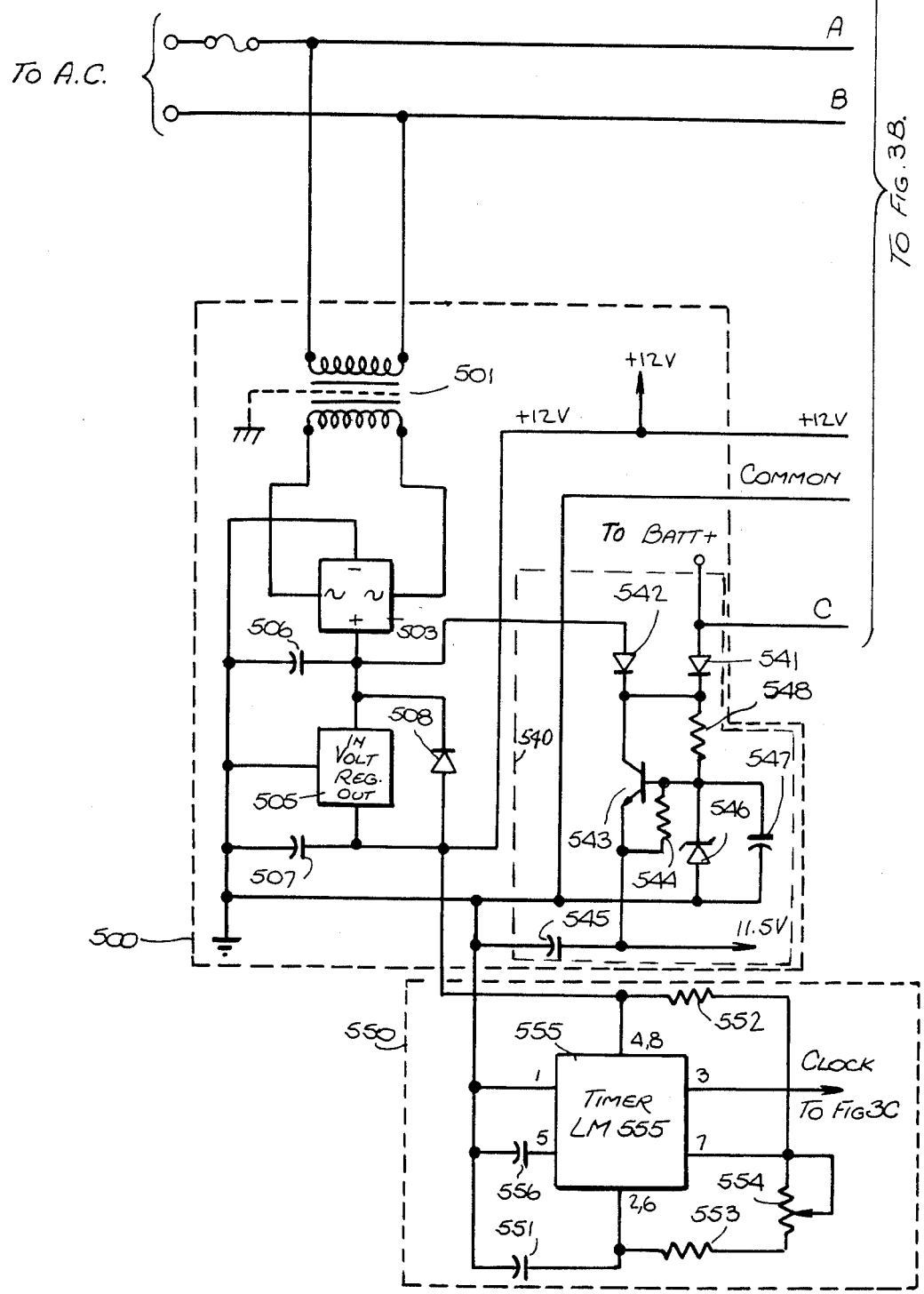

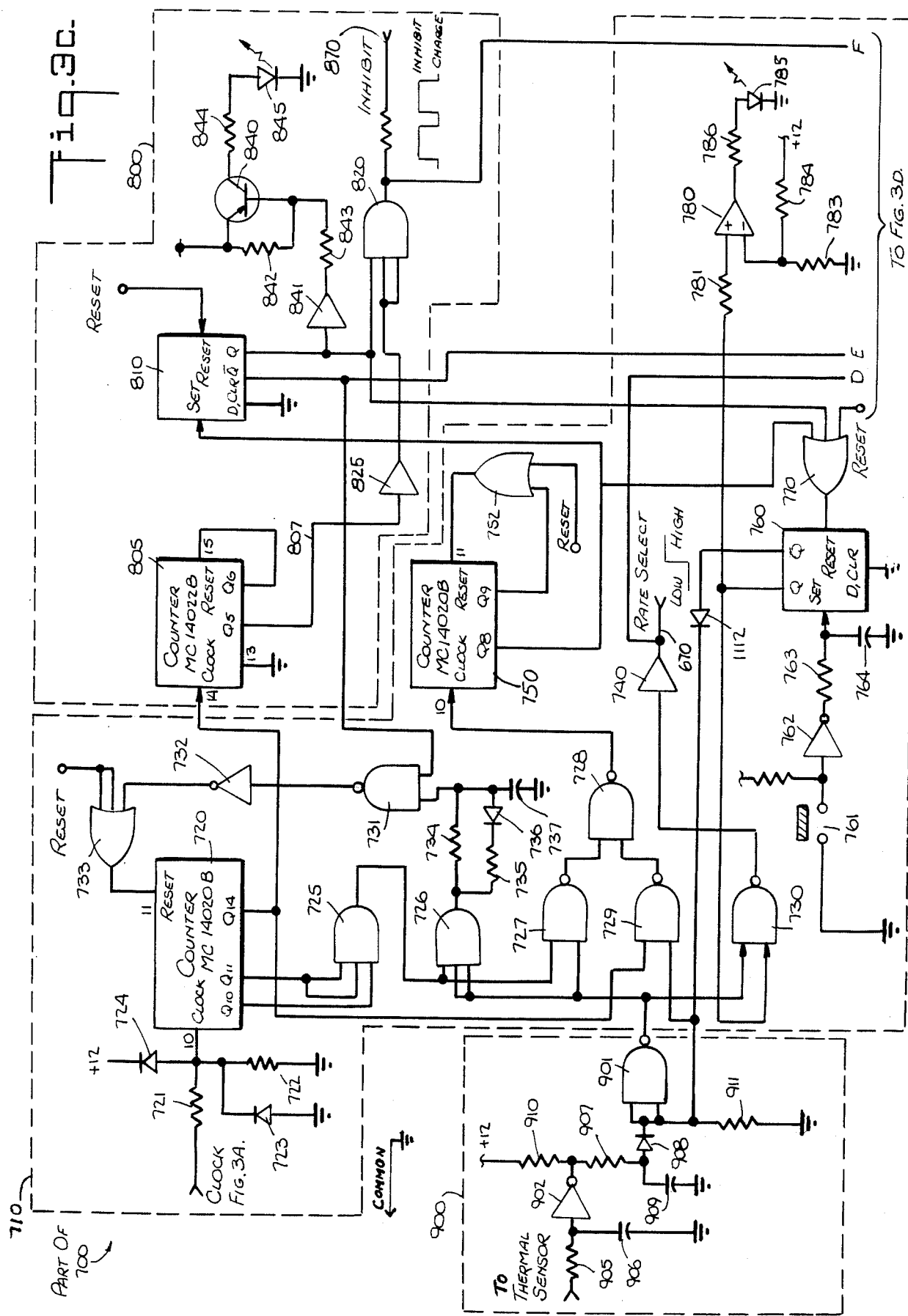

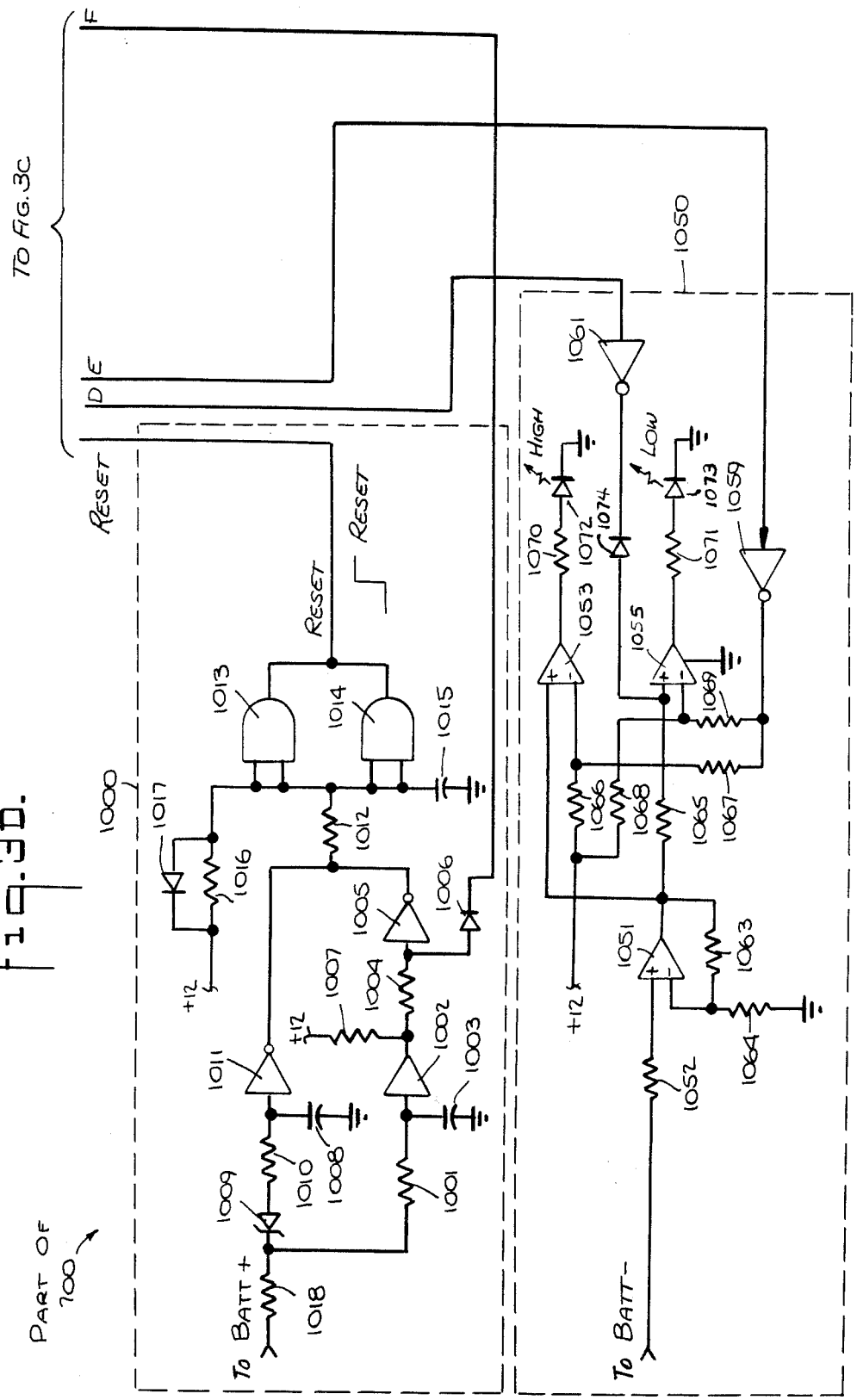

BATTERY CHARGING APPARATUS AND METHOD

BACKGROUND OF THE INVENTION

1. Field of the Invention

The present invention relates to the field of battery charging in general, and more particularly, it relates to a multi-mode controlled current battery charging apparatus which delivers a constant current to a battery to be charged for a predetermined time. After termination of the constant current charge, the charging apparatus of the present invention provides a pulsed current to the battery to prevent self-discharge. In a preferred form of the invention, the battery charging apparatus is responsive to the temperature of the battery being charged, so that a lower constant current is delivered to the battery when the temperature of the battery increases beyond a predetermined point. The invention has particular application to Nickel-Cadmium rechargeable batteries (NiCd).

2. Description of the Prior Art

The traditional approach to charging NiCd type batteries has been to monitor the battery cell voltage and to terminate the charge once the cell has reached a predetermined voltage. This procedure works well for a single cell. With multi-cell batteries, this procedure does not succeed because the individual cells often have different voltage terminating charging characteristics. This will allow some cells to overcharge and heat up compared to others, thus damaging the overcharged cells. Additionally, when charging using the prior art charging apparatus is terminated, NiCd batteries will tend to self discharge.

Other known methods have applied constant currents to the batteries being charged, sometimes with high and low or trickle rates. Applying constant currents to NiCd batteries for an indefinite period of time causes excessive heating and gas build-up which weakens the electrolyte and greatly accelerates the decomposition of organic materials within the cell, including plate separators and seals.

Accordingly, it is an object of the invention to provide a battery charger which will charge batteries without damage to the battery.

It is a further object of the invention to provide such a battery charger which has particular application to NiCd batteries.

It is another object of the invention to provide a battery charger which prevents self discharge of batteries after they have been fully charged.

It is a still further object of the invention to provide a battery charger which prevents self-discharge of NiCd batteries after they have been fully charged by pulsing the batteries at relatively long intervals with charging current.

It is a yet further object of the present invention to provide a multi-mode constant current source battery charger which responds to the temperature of the battery being charged so as to initiate charging at a lower current rate when the battery temperature exceeds a specified temperature.

It is yet another object of the invention to provide a battery charger which can safely and efficiently charge a wide variety of batteries by accommodating a large range of cell combinations.

SUMMARY OF THE INVENTION

These and other objects of the present invention are achieved by a battery charger comprising controlled current source means which can be coupled to a battery to be charged for sourcing current to the battery and having an inhibiting input for inhibiting the sourcing of current, counting means for generating a timing signal which changes from a first state to a second state after a time interval, and means for generating a pulsing signal responsive to the timing signal, the inhibiting input of the current source means responsive to the pulsing signal when the timing signal is in the second state, the current source means delivering a constant current when the timing signal is in a first state so as to substantially fully charge the battery and delivering a pulsed current to the battery when the timing signal is in the second state so as to keep the battery from self-discharging after the battery is substantially fully charged.

In a preferred embodiment, the battery charger further comprises means for generating a two-state signal responsive to the temperature of the battery being charged, the signal being in a first state when the battery is below a threshold temperature and being in a second state when the battery is above the threshold temperature and wherein the current source means has a further input for determining the current, from two different constant current levels, sourced by the current source means to the battery, the further input responsive to the two-state signal so as to charge the battery at a first constant current rate when the two-state signal is in the first state and to charge the battery at a second, reduced constant current rate when the two-state signal is in the second state.

Two alternative embodiments of the preferred form of the invention are described herein, one utilizing a continuous linear constant current source means, and the other utilizing a switching mode constant current source means.

BRIEF DESCRIPTION OF THE DRAWINGS

The invention will be described in greater detail in the following detailed description with reference to the drawings, in which:

FIGS. 2A and 2B, taken as a whole, are a schematic diagram of a first embodiment of the invention; and FIGS. 3A through 3D, taken as a whole, are a schematic diagram of a second embodiment of the invention.

DETAILED DESCRIPTION

Figure 1:
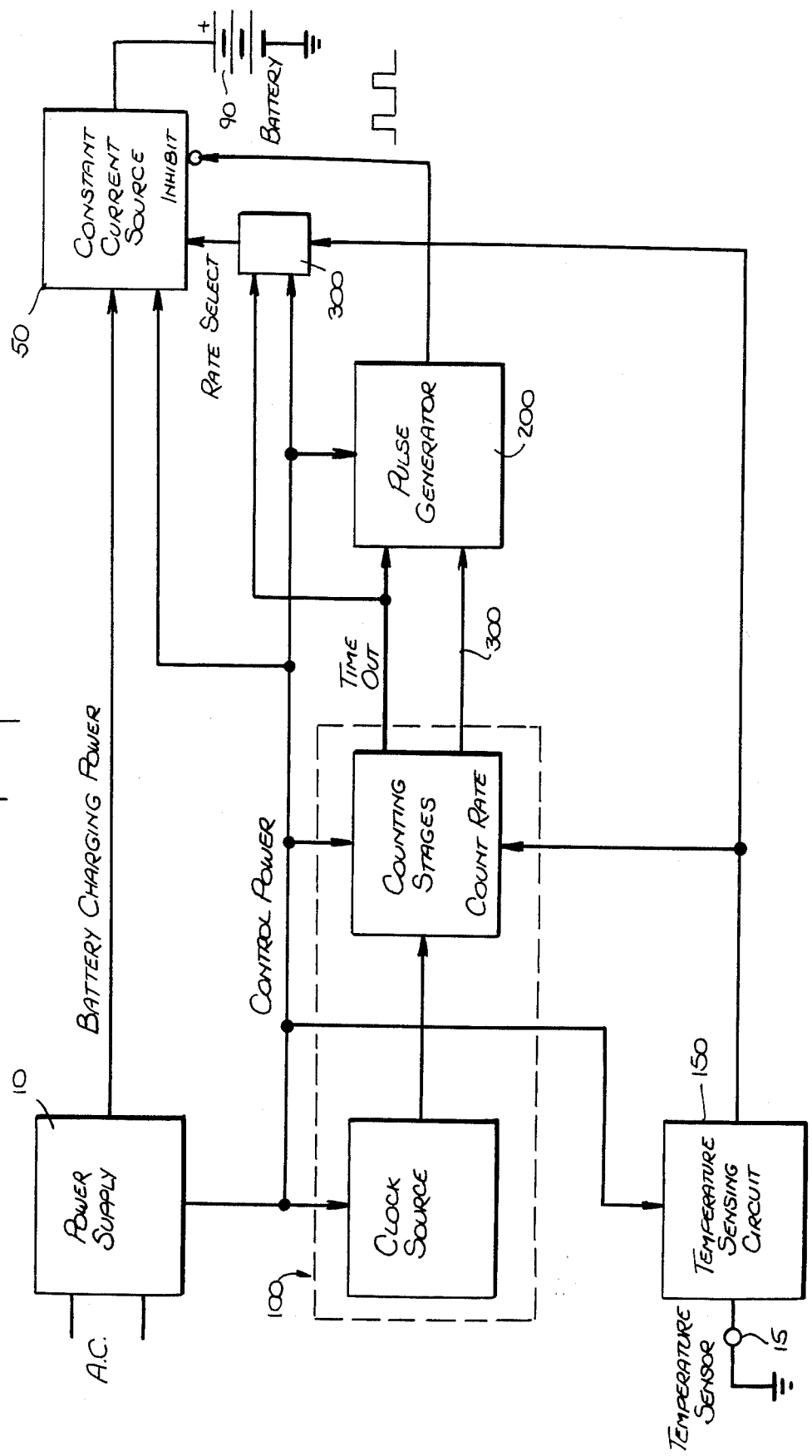
FIG. 1 is a basic block diagram of the battery charger according to the invention.

With reference now to the drawings, FIG. 1 illustrates the basic block diagram of the preferred form of the battery charging apparatus. The apparatus comprises a constant current source 50 which is coupled to the battery 90 to be charged. The constant current source is fed power from a power supply 10 which also feeds logic control power to all the other blocks. Power supply 10 and constant current source 50 can, of course, be considered to be one single block, but they are shown separately for clarity of explanation. In addition, the circuit includes a clock generator and counting stages 100, which could be constructed in one stage or in several stages as shown by the dashed lines. A thermal temperature sensor 15 which is preferably part of the battery 90 feeds a signal to the temperature sensing circuit 150 which then provides an appropriate signal to the counting stages, so as to determine the counting rate, and to the constant current source 50 via gating circuit 300 which can be part of the current source 50, part of the counting stasges 10 or divided between both, so as to determine the constant current charging rate. At a high current rate, the counting stages will time out more quickly than at a low current rate so that the same amount of total accumulated charge is delivered to the battery as if the battery was charged at a single constant rate. Upon timing out, the counting stages cause a pulse generator 200 to intermittently inhibit the charging current so as to pulse charge the battery, preferably at an approximately 20% duty cycle and with several minutes between pulses. Additionally, the timing out of the counting stages also causes the selection of the low current charging rate via gating circuit 300 during the pulsed mode of operation.

FIGS. 2A and 2B are the schematic diagram of a first embodiment of the invention employing a linear continuous constant current source. This embodiment comprises power supply 10, constant current source 50, clock and counting circuitry 100, temperature sensing circuit 150 and pulse generator 200 for generating a pulsing charging current control signal. The invention may further comprise certain peripheral circuits for lighting display devices and a reset circuit 250 for determining when a battery is not connected to the charger and to reset the charger when it is first powered on.

The embodiment of FIGS. 2A and 2B may now be explained. The power supply 10 comprises a conventional regulated power supply including a transformer 1, which may have primary taps 3 for use with varying a.c. input operating voltages. The secondary of transformer 1 is coupled to full wave rectifiers 5 in conventional fashion. Regulating circuitry, including, for example, over-voltage protection Zener diode 6, filter capacitor 7 and a linear voltage regulator 8, such as a type LM 7812, are connected in conventional fashion so as to provide a power supply voltage for the charging control circuit itself, which in the illustrated embodiment is 12 volts. Additional parasitic filtering capacitor 9 is coupled in parallel to the output of regulator 8. A diode 11 is coupled between the input and output of regulator 8 so as to provide transient suppression.

The power supply voltage at the output of the full wave rectifier 5 and at the input of regulator 8 is coupled to the constant current source 50, and provides power for battery charging. The voltage at the input to regulator 8 is 25 volts in the illustrated embodiment.

The constant current source 50 includes an adjustable voltage regulator 51, which may be, for example, a type LM 317 adjustable voltage regulator. In its basic form, voltage regulator 51 outputs a voltage higher than the voltage of the battery or batteries 90 connected to the output terminal of the charging circuit. A resistor 55 which provides an indication of the current drawn is coupled in series with the regulator output along with a diode 56 which prevents discharge of the battery through the circuit when a pulsed charging current is present or the battery charger is turned off with a battery still connected. Variable resistor 57 and resistor 58 are coupled in series between the output side of resistor 55 and the adjustment input of regulator 51. Variable resistor 57 serves to adjust the low current charging rate and serves as a feedback path for maintaining the constant current level through resistor 55. A transistor 63 has its emitter-collector circuit coupled in series with a series/parallel circuit comprising resistors 59, 60 and 61. Variable resistor 60 serves to adjust the high current charging rate. The base of transistor 63 is coupled via resistor 64 and diode 65 to the collector of a further transistor 53, whose emitter is grounded. Base biasing for transistor 63 is provided by resistor 70. The base of transistor 53 is coupled to the output of NAND gate 130 which is part of counting circuitry 100, to be described later, via the voltage divider comprising resistors 67 and 68. The level of the two state signal at the output of NAND gate 130 determines the current charging rate to the battery, as will be explained below.

An additional transistor 73 is coupled in its emitter-collector circuit to the adjustment input of regulator 51 via a resistor 69. The base of transistor 73 is coupled, via resistors 74 and 75, to the output of NAND gate 240, which is part of the pulse generating circuit 200, which will be described later. Transistor 73 inhibits charging current when its base is forward biased, so that when the base voltage rises, no charging current flows to the battery. Diode 56 prevents the battery from discharging into the charging circuit when transistor 73 is turned on.

Thus, a constant current charging source which is programmable between two different charging current levels and which allows for pulsed operation, to be discussed later, has been described.

Counting circuitry 100 includes a clock signal source which may comprise an oscillator and divide by n divider 102 and further counting stage 120. Additionally, the circuit comprises a number of logic gates 130, 131, 132 and 133.

Oscillator/divider 102 may be a CMOS type MC 14521B oscillator/$2^{24}$ divider, for example. The oscillator portion operates, in the preferred embodiment, at a frequency of 74.445 KHz. The frequency determining external components are connected in conventional fashion and include resistors 103, 104 and 105 and capacitor 106. The frequency division portion of oscillator/divider 102 divides the 74.445 KHz signal down to 0.284 Hz and 0.142 Hz at the appropriate output taps ($Q_{18}$ and $Q_{19}$ respectively) of the oscillator/divider ($\div 218$ and $\div 219$ respectively). These signals are fed to NAND gates 132 and 131 respectively. The output of NAND gate 130, which is connected as an inverter, is coupled to the other input of NAND gate 132. The input of NAND gate 130 is coupled to the other input of NAND gate 131. The output of NAND gates 132 and 131 are coupled to the inputs of NAND gate 133, the output of which is coupled to counter 120, the operation of which will be explained below. The NAND gates may comprise CMOS type CD4093 NAND gates, for example.

The input of NAND gate 130 is coupled to the output of temperature sensing circuit 150, which comprises transistors 152 and 162 and associated circuitry. The signal from a thermal sensor which is either a part of the battery or in close contact therewith is coupled to the base of transistor 162 via the series/parallel circuitry comprising resistor 153, diodes 154 and 155, resistor 156, capacitor 157 and resistors 158 and 159. When a battery at a temperature below the threshold of the termal sensor is coupled to the charging circuit, the thermal sensor will be closed, thus coupling the battery output voltage to the temperature sensing circuit input, charging capacitor 157 and turning transistor 162 on. The collector of transistor 162 therefore goes low and the output of NAND gate 130 goes to a logic 1. NAND gate 132 is enabled by the logic 1 output of NAND gate 130, thus allowing the 0.284 Hz signal to pass to NAND gate 133 in inverted form. NAND gate 131 is disabled by the logic 0 at one of its inputs, thus blocking the 0.142 Hz signal. NAND gate 133 inverts the 0.284 Hz signal and couples it to counter 120. Thus, when the battery is cool, the 0.284 Hz clock signal is selected.

When the battery temperature rises during charging, the thermal sensor opens, allowing capacitor 157 to discharge. Transistor 162 is biased off, thus forcing the collector high and the output of NAND gate 130 low. NAND gate 132 is now disabled and NAND gate 131 is enabled, thus allowing the 0.142 Hz signal to pass to counter 120. Thus, once the battery temperature rises, the 0.142 Hz clock signal is selected, thus clocking counter 120 at a lower rate.

Counter 120 may be, for example a CMOS type MC14020B 14 stage binary/ripple counter. The input signal, either 0.284 Hz or 0.142 Hz, may be coupled to the clock input of the counter by way of a two position switch 121, which allows a test signal input to be coupled to the circuit via resistor 126 in order to check the operation of the circuit with a higher frequency signal. Resistor 127 ties the clock input to ground when no signal is present and diodes 122 and 123 are connected to counter 120 for transient suppression. The 14th stage ($Q_{14}$) output ($\div 2^{14}$) 125 of counter 120 is coupled to latch or D flip flop 220, part of the pulse generating circuit. Line 125 will take approximately 8 hours to go high if counter 120 is clocked at 0.284 Hz and 16 hours if clocked at 0.142 Hz. The fourth order output ($Q_4$) ($\div 2^4$) of counter 120 is coupled to the clock input of counter 210 via line 124. This line has a frequency of 0.018 Hz or 0.009 Hz, depending on the input clock frequency.

Counter 210 is connected as a leading-edge triggered Johnson counter, having its sixth stage output ($Q_6$) coupled back to its reset input by diode 212. Counter 210 may comprise, for example, a CMOS type MC14022B counter/divider with decoded outputs. The fifth stage output ($Q_5$) will go high after five input pulses. On the sixth input pulse, the sixth stage output ($Q_6$) will go high, thus resetting the counter to 0. Thus, the fifth stage output ($Q_5$) will be low for four input pulses and high for the fifth in repetitive sequence. Since input line 124 has a frequency of 0.018 Hz (Period=55.6 secs.) or 0.009 Hz (Period=113 secs.) depending on the battery temperature, the output line 214 of counter 210 is a pulsing signal that is on for 55.6 secs. and off for 3.7 minutes (0.018 Hz input) or on for 1.9 minutes and off for 7.5 minutes (0.009 Hz input), for a 20% duty cycle. This signal is coupled to inverting NAND gate 216 and thence to one input of NAND gate 230.

Before the 14th stage output ($Q_{14}$) of counter 120 goes high, the Q output of D flip-flop 220, which may comprise a type MC 4013 D flip flop having set and reset inputs, remains low. This signal is coupled to the other input of NAND gate 230, thus disabling the output of NAND gate 230 and forcing it to a logic 1. The output of NAND gate 240 coupled thereto is therefore a logic 0, and the pulsing signal on line 214 does not appear at the output of NAND gate 240. The logic 0 level maintains transistor 73 off, so that the current source outputs a constant current at a rate determined by the level of the signal at the base of transistor 53, to be explained below.

Additionally, the Q output of flip flop 220 is coupled to the base of transistor 152 via resistors 170 and 171. Before line 125 ($Q_{14}$ of counter 120) goes high, transistor 152 is maintained in an off state, thus having no effect on the operation of temperature sensing circuit 150.

Once line 125 goes high, however, flip flop 220 sets and its Q output goes high. This couples the pulsing signal on line 214 to the base of transistor 73, although in inverted form (80% on, 20% off) via gates 230 and 240. Additionally, the logic 1 Q output of flip flop 220 turns transistor 152 on, thus shorting the input of temperature sensing circuit 150 and turning transistor 162 off. A logic 1 is placed at one input of NAND gate 131 and NAND gate 132 is disabled. Therefore, the 0.142 Hz signal is selected when the Q output of flip flop 220 goes high, and at the same time, the temperature sensing circuit will no longer respond to signals from the thermal sensor. Since the 0.142 Hz signal is selected, the fourth stage output ($Q_{14}$) of counter 120 is a 0.009 Hz signal, and line 214 is on for 1.9 minutes and off for 7.5 minutes, thus pulsing transistor 73 on for 7.5 minutes and off for 1.9 minutes. This inhibits regulator 51 for 7.5 minutes and allows current to flow for 1.9 minutes.

The output current of current source 50 is determined by the level of the signal at the base of transistor 53. Prior to the time when line 125 goes high, the signal at the base of transistor 53 can be either high or low. It will be high when the battery is cold (0.284 Hz clock selected) and will be low if the battery should be heated past the threshold of the thermal sensor (0.142 Hz clock selected).

If the base of transistor 53 is high, transistor 53 will be biased on, thus forcing the base of transistor 63 to ground and allowing transistor 63 to conduct. This places a shunt resistance comprising the forward resistance of transistor 63 and small resistance 59 in series therewith across resistor 55, thus allowing a greater current to be sourced to the battery. In the circuit illustrated in FIGS. 2A and 2B, a preferred high current rate is approximately 625 mA.

Should the battery heat up past the thermal sensor's threshold, the base of transistor 53 will go low, turning both transistors 53 and 63 off. The bulk of the current therefore flows through resistor 55, and since the shunt has been removed, the sourced current decreases. In the illustrated embodiment, an approximately 350 mA current is preferably delivered to the battery after it becomes heated. This reduced current prevents the damage which might occur at higher current levels when the battery is hot. The battery charger thus charges the battery at a reduced current rate for a longer time period while the battery temperature increases above the threshold so that the same amount of total accumulated charge is supplied to the battery as if the battery was charged at a single constant rate.

As explained above, once line 125 goes high, the Q output of flip flop 220 goes high and the pulsing signal appears at the base of transistor 73. This logic 1 Q output disables the temperature sensing circuit, as explained above, so that the collector of transistor 162 remains high, thus forcing the output of gate 130 low. The base of transistor 53 coupled thereto by resistor 67 is thus forced low, keeping transistors 53 and 63 off. Thus, when the battery charger enters the pulsing mode, the battery is pulsed (20% on, 80% off) at the lower current (approximately 350 mA in the illustrated embodiment). This lower current pulsing, which averages out over time to an even lower rate, helps to prevent the battery from self-discharging after the constant current cycle is complete.

Thus, the circuit of the illustrated embodiment of FIGS. 2A and 2B has performed the following functions: When the battery is cold, it is charged at a high constant current rate for a time period determined by a counter. Should the battery heat up excessively, the circuit switches to a lower constant current rate and continues at this lower rate until the counter times out. The counter counts more slowly when the lower current is drawn by the battery so that the same amount of charge is still absorbed by the battery. Once the counter times out and the battery has absorbed a substantially full charge, it is kept from discharging by pulse charging the battery at the lower current rate for 20% of the time. The finite time period during which the battery is charged prevents battery damage including damage to organic materials, separators and seals and weakening of the electrolyte, thus prolonging the life of the battery.

The described circuit will allow the simultaneous charging of a large number of batteries, for example 20, connected in series. Because of the constant current mode of charging and the temperature protection provided by the circuit, even a single cell can be charged without damage.

The circuit also includes certain peripheral circuits. For example, light emitting diode 300 will conduct through resistor 301 when transistor 53 is turned on, thus indicating that the charging circuit is in the high current mode. Transistor 310 is biased on through resistor 311 whenever sufficient current is flowing through resistor 55, thus lighting up LED 312 through transistor 340 and resistor 313 and indicating that the battery is charging. Transistor 340 is biased on during this time by the $\overline{Q}$ output of flip flop 220, which is at a logic 1 level during normal constant current charging. The logic 1 level biases transistor 330 on through resistor 331 which in turn biases transistor 340 on through resistor 332, allowing current to flow through LED 312. Resistor 333 provides proper base bias for transistor 340.

Transistor 320 is biased on through resistor 319 when the charging circuit goes into the pulsing mode when the Q output of flip flop 220 goes high, thus lighting up LED 322. Transistors 330 and 340 are employed to blank out LED 312 once the charging circuit goes into the pulsing mode. The $\overline{Q}$ output of flip flop 220, which goes low when the charging circuit enters the pulsing mode, turns transistor 330 off which in turn switches transistor 340 off, thus allowing insufficient current to flow through LED 312, turning it off during the pulsing mode.

An automatic reset circuit 250 comprising transistor 252 and NAND gate 255 and associated circuitry is additionally employed to reset the counting circuitry 100 and pulse generating circuitry 200 on initial power turn on and whenever a battery is not connected to the charging circuit output.

When the charging battery is disconnected, the output voltage of the constant current source 50 will tend to increase toward its maximum in order to attempt to maintain a constant current. The increased voltage will allow current to flow through Zener diode 251 through resistors 254, 256 and 258. This will place a sufficient voltage across resistor 258 to switch transistor 252 on. Accordingly, the collector will go low, placing a logic 0 on one input of NAND gate 255. The other input of NAND gate 255 is at a logic 1 level because capacitor 260 is charged through resistor 261 from the logic voltage source. Thus, the output of NAND gate 255 goes to a logic 1, resetting flip flop 220 and counters 120 and 210. The charging circuit is therefore kept in a reset state until a battery is reconnected.

On initial power turn on, as capacitor 260 first charges up, a logic 0 pulse at the junction of resistor 261 and capacitor 260 will force the output of NAND gate 255 high for a brief period, thus resetting flip flop 220 and counters 120 and 210.

FIGS. 3A through 3D show an alternative embodiment of the invention. The circuit of FIGS. 3A through 3D includes a logic power supply 500, a clock signal source 550, a constant current source 600, and logic circuitry 700, to be described later, for controlling the current source 600.

Logic power supply 500 includes a transformer 501 feeding a bridge rectifier 503. The rectifier current is coupled to a voltage regulator 505, for example, a type LM 7812 12 volt regulator, in conventional fashion, including filtering capacitors 506 and 507 and suppression diode 508. The output of regulator 505 is coupled to the current source 600 by line 510 to provide power to the current source controller 610, to be described later. The power supply 500 may also include a separate second regulator 540 of conventional design which provides, for example, 11.5 volt power for the logic circuitry 700. Regulator 540 includes pass transistor 543, zener reference diode 546, biasing resistor 544, current limiting resistor 548 for zener diode 546 and filter capacitors 547 and 545. Regulator 540 is powered by either the output of rectifier 503 from the a.c. line through diode 542 or by the battery being charged itself via diode 541 so that in the case of power failure, the logic circuitry will remain in a known state.

Current source 600 includes a switching mode regulator controller 610 which might comprise a type LM3524 pulse width modulated switching regulator feeding a pulse transformer 620. The secondaries of pulse transformer 620 are coupled to a half-bridge switching mode inverter 630, which supplied power from rectifier/filter circuitry 640 to output transformer 650. The secondary of output transformer 650 is coupled to full wave rectifier 652. The output from rectifier 652 is coupled to a switching mode regulator filter 656 which includes inductor 654 and capacitor 655. The battery to be charged is coupled across capacitor 655 in series with a current sensing resistor 657. The way in which switching mode regulator 610 is controlled may now be explained.

Switching mode regulator controler 610 outputs a pulse width modulated signal, the width of the output pulse varying with the magnitude of the signal at the control input. In the illustrated embodiment, wherein a type LM3524 switching mode regulator is used as the controller, terminal 1 is the control input. A comparison reference signal is present at the reference input, terminal 2. This reference signal is generated by the voltage divider comprising resistors 611 and 612 fed by the 5 volt reference output signal at terminal 16, which is internally generated by the switching regulator controller. Power for the switching mode regulator controller is coupled to terminal 15. The output of the switching regulator controller is present at terminals 12 and 13. Terminals 10 is an inhibit terminal which will turn the switching regulator controller off when this line goes to a logic 1, thus preventing battery charging. The remaining terminals are connected in conventional fashion. Components 614, 616 and 617 are timing components for the triangle wave generator contained within controller 610. Further description of the type LM3524 switching mode regulator can be found in the existing literature. It is to be noted that other switching mode regulator integrated circuits may be employed instead of controller 610, or that the controller circuit could be constructed from discrete components in a known manner.

The output of controller 610 includes two out of phase square waves on terminals 12 and 13. The duty cycle or pulse width varies in relation to the signal on the control input, terminal 1. When the voltage on terminal 1 is less than the reference voltage on terminal 2 by a certain amount, the outputs will be two out of phase square waves having a 50% duty cycle. The duty cycle is reduced when the voltage on terminal 1 is increased towards the voltage on terminal 2. Operational amplifier 631, which preferably is a type CA3130 operational amplifier, is employed to vary its output voltage in proportion to the voltage drop across, or current through, resistor 657. The negative battery side of resistor 657 is coupled to the non-inverting input of operational amplifier 631 via resistors 675 and 676. Resistors 621, 622 and 623 determine the gain of operational amplifier 623. A feedback loop is thus provided so that, should the current through resistor 657 change, the duty cycle of the output of the switching mode regulator 600 will be varied accordingly so as to drive the current back toward the desired constant value. As will be explained below, the illustrated embodiment of FIGS. 3A through 3D provides a dual rate charging current like the circuit of FIGS. 2A and 2B although with a high rate of approximately 4 amperes and a lower rate of approximately 350 mA. The rate is determined by the status of line 670, which is coupled to logic circuitry 700.

Figure 3B:
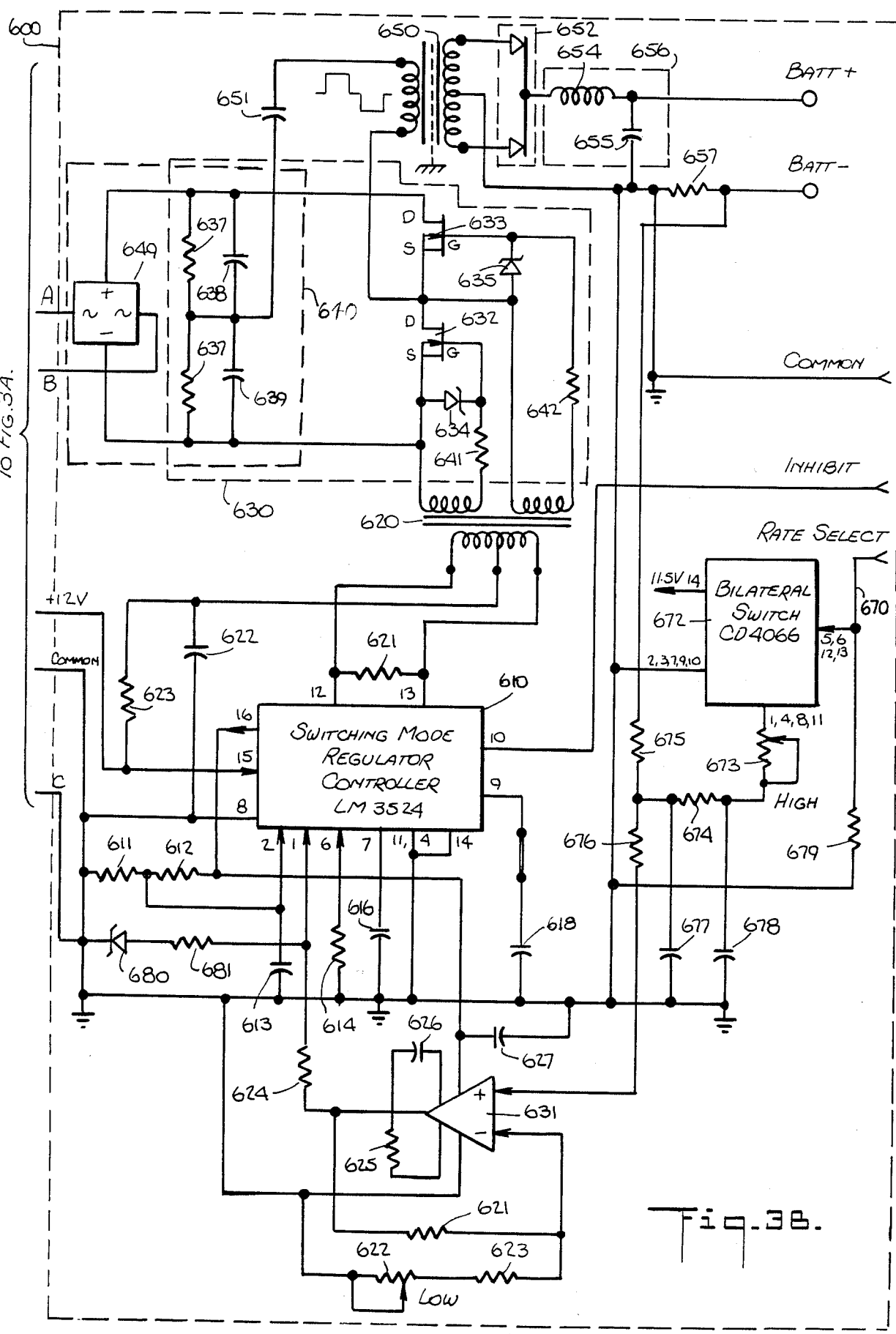

Line 670 is coupled to the control input of a bilateral switch 672, which might comprise, for example a CMOS type CD4066. Resistor 679 is coupled across the control input to ground. As shown in FIG. 3B, bilateral switch 672 is coupled across current sense resistor 657 by resistors 673, 674 and 675. Capacitors 677 and 678 are coupled between the respective ends of resistor 674 and ground and provide transient suppression. Resistor 676 is coupled between resistor 675 and the non-inverting input of operational amplifier 631. When a high charging rate is required (consistent with the temperature of the battery), line 670 will be at a logic 1 level, thus switching bilateral switch 672 on. This will shunt the effective impedance of the bilateral switch and resistors 673, 674 and 675 across resistor 657. In effect, the voltage across resistor 657 is placed across a voltage divider comprising resistors 675, 674, 673 and the impedance of the bilateral switch. The voltage divider is tapped and coupled to operational amplifier 620 by resistor 676. When the bilateral switch turns on, a smaller voltage is coupled to the non-inverting input of operational amplifier 631, thus driving the output of operational amplifier 631 lower. This signal is coupled to the control input of controller 610, which outputs increased width pulses, and the current through resistor 657 and to the battery is accordingly increased until the control input again equals the reference input. Variable resistor 673 is used to accurately adjust the high current charging rate. In the illustrated embodiment, it has been found practical to employ a high rate of approximately 4 A and a low rate of 350 mA.

The operation of half-bridge switching mode inverter 630 may now be explained. Output pulses from switching mode regulator controller 610 are coupled to the primary of pulse transformer 620. Pulse transformer 620 has two secondaries, which are respectively coupled to the gates of field effect transistors 632 and 633. Zener diodes 634 and 635 clamp the secondary voltages to an approximately 10 volt level. The secondaries are wound so that the signals across the respective secondaries are out of phase. Thus, the two transistors 632 and 633 will be switched on at different times by different pulses. Transistor 633 connects the primary of output transformer 650 to the positive side of the rectified and filtered line voltage from rectifier bridge 649 while transistor 632 connects the primary to the negative side. Filter capacitors 638 and 639 are employed to filter the rectified line voltage and are connected so that a d.c. level of approximately one-half the rectified line voltage is obtained at their junction. Blocking capacitor 651 blocks the DC level and thus a signal like that shown in FIG. 3B adjacent transformer 650 is coupled to its primary. The width of the pulses depends on the duty cycle of the out of phase signals at the output of switching mode regulator controller 610.

The pulsed signal in the primary of transformer 650 is stepped down in its secondary, rectified by full wave rectifier 652, filtered by filter 656 and supplied to the battery as an essentially constant current.

Logic circuitry 700 may now be explained. Similar to the embodiment shown in FIG. 2B, logic-circuitry 700 comprises counting circuitry 710 fed by clock signal source 550, circuit 800 for generating a pulsing charging control signal and battery temperature sensing circuit 900. The logic circuitry further preferably comprises certain peripheral circuits including automatic reset circuit 1000 and display circuit 1050.

Clock generation circuitry 550 in the illustrated embodiment is an astable multivibrator and might comprise a type LM555 timer IC denoted in FIG. 3A by reference 555. This circuit is constructed in conventional fashion and includes resistors 552, 553 and 554 and capacitors 551 and 556. The setting of variable resistor 554 determines the clock frequency. In the illustrated embodiment, a clock frequency of approximately 68 Hz is preferably generated.

The clock signal is fed to a counter 720, which might comprise a CMOS type MC14020B binary/ripple counter. The clock signal is coupled to the counter clock input by resistor 721. Resistor 722 is coupled across the counter input and ground and diodes 723 and 724 are provided for transient suppression.

The tenth stage ($Q_{10}, \div 2^{10}$) and eleventh stage ($Q_{11}, \div 2^{11}$) outputs of the counter are coupled to respective inputs of AND gate 725, which might comprise a CMOS type CD4073 AND gate. Since the input signals to AND gate 725 have frequencies which vary from each other by a factor of two, the output of AND gate 725 will be a signal which pulses high after the second pulse has appeared on the $Q_{10}$ output line when $Q_{11}$ and $Q_{10}$ are both high. The output of AND gate 725 is coupled to an input of a further AND gate 726, which may be another gate within the CMOS type CD4073 AND gate and to an input of NAND gate 727, which may be a CD4093 NAND gate. The other inputs of AND gate 726 and NAND gate 727 are coupled together and to the output of a further NAND gate 901 which is part of the battery temperature sensing circuitry 900. The output of NAND gate 901 is further coupled to one input of another NAND gate 730. The input of NAND gate 901, which functions as an inverter, is coupled to one input of a further NAND gate 729. The remaining input of NAND gate 729 is coupled to the $Q_{14}$ output ($\div 2^{14}$) of counter 720. The outputs of NAND gate 727 and 729 are coupled to the respective inputs of NAND gate 728, the output of which is coupled to the clock input of a further counter 750.

Temperature sensing circuitry 900 operates as follows: When the battery is below the temperature at which the thermal sensor which is part of, or attached to, the battery opens, a voltage will be delivered to the input of inverting stage 902 via resistor 905. Capacitor 906 is provided for transient suppression. Inverting stage 902 may be a Darlington transistor stage such as type ULN2004, for example. A logic 0 appears at the output of inverting stage 902, which is coupled to inverting NAND gate 901 by resistor 907 and diode 908. Resistor 910 provides a voltage supply for the open collector of inverter 902. Capacitor 909 and resistor 907 provide a small R-C delay. A logic 1 level appears at the output of NAND gate 901 which is coupled to NAND gates 727 and 730 and AND gate 726, thus enabling these gates. The logic 0 level at the input of NAND gate 901 is coupled to NAND gate 729, thus inhibiting this gate and forcing its output to a logic 1 level. Therefore, when the battery is below the thermal threshold temperature, the $Q_{14}$ output signal of counter 720 will be blocked by NAND gate 729. NAND gate 727 will allow the pulsed output of AND gate 725 to pass through in inverted form to NAND gate 728. This signal will be further inverted by NAND gate 728 and is coupled to the clock input of counter 750, thus clocking counter 750.

The output of AND gate 726 will pass the pulse from AND gate 725 because the other two inputs of AND gate 726 are at a logic 1 level. This pulse will be coupled to one input of NAND gate 731 via the RCD circuit comprising resistor 734 in parallel with the series combination of resistor 735 and diode 736. Capacitor 737 adds a small R-C delay and provides pulse width extension. The remaining input of NAND gate 731 is at a logic 1 level at this time due to a signal from the Q output of flip flop 810 in pulse mode generation circuit 800. Thus, the pulse from AND gate 726 passes through, in an inverted state, to inverter 732, and thence to OR gate 733. The output of OR gate 733 then resets and truncates the count in counter 720 and the counter will recount until both the $Q_{10}$ and $Q_{11}$ outputs are high, thus repeating the above sequence. This truncated counter arrangement provides an approximately 10.6:1 ratio between the frequencies at the output of AND gate 725 and the $Q_{14}$ output of counter 720.

The output of NAND gate 730 is further coupled to an inverter 740, the output of which is coupled to line 670, thus selecting the charging current rate. In the illustrated embodiment, when the battery temperature is below the threshold temperature of the thermal sensor and the Q output of flip-flop 760, part of a fast charge initiation circuit, coupled to the other input of NAND gate 730, is a logic 1, the output of inverter 740 will be a logic 1, thus selecting the high current charging rate as described earlier. The purpose of the fast charge initiation circuit will be described later.

Should the battery temperature increase above the threshold temperature, the output of NAND gate 901 will go low, thus inhibiting NAND gates 727 and 730 and AND gate 726 and enabling NAND gate 729. The slow $Q_{14}$ output signal of counter 720 will then be coupled to the clock input of counter 750, thus allowing counter 750 to count at a slower rate. At the same time, the output of inverter 740 is forced low, thus causing the current source 600 to charge the battery at the lower current rate. Thus, when the battery temperature exceeds the threshold of the thermal sensor, the battery is charged at a lower current rate for a time period determined by a counter which is accordingly clocked at a reduced rate so that the battery is charged substantially the same amount as if it had been charged at a single constant current rate with the counter clocked at a single rate. The two counter rates are related so that they are substantially inversely proportional to the ratio of the high current rate to the reduced current rate.

Counter 750, which may be another CMOS type MC14020, will time out after a specified time determined by which clocking rate has been selected by the temperature sensing circuit. In the illustrated embodiment, the eighth stage output ($Q_8$) of counter 750 is coupled to flip flop 810, part of the pulse mode generation circuitry to be described later. Typically, the output of counter 750 will go to a logic 1 level after approximately 90 minutes in the high constant current charge mode if it remained in that mode and after approximately 16 hours in the low constant current charge mode, if it charged only at that rate, for an approximately 1:10.6 ratio.

Once counter 750 times out, the charging circuit enters the pulsed charge mode. The pulsing signal is generated by circuit 800. The output of circuit 800 is present on line 870, which is coupled to the inhibiting input of switching mode regulator controller 610 so as to inhibit charging whenever line 870 is at a logic 1 level.

Pulse generator circuit 800 includes a Johnson counter 805 and flip flop 810. The counter 805 may comprise a CMOS type MC14022B counter/divider and flip flop 810 may comprise a CMOS type MC4013 D flip flop having set and reset inputs. Counter 805 has its clock input coupled to the $Q_{14}$ output of counter 720 and outputs a pulse in the same manner as counter 210 of FIG. 2B. Thus, a pulse appears on output line 807 once every five input pulses and line 808 resets the counter on the sixth pulse. Thus, a 20% duty cycle pulse is present on line 807.

Once counter 750 times out after the constant current charging cycle is complete, flip flop 810, which has its set input coupled to the $Q_8$ output of counter 750, will set. Thus, the Q output will go high. At the same time, flip-flops 810 and 760, NAND gate 730 and inverter 740 select the lower current rate during the pulsed charge mode. The Q output of flip flop 810 and the output of Johnson counter 805 are coupled to AND gate 820, the latter via inverter 825. Thus, the output of AND gate 820, which will be a pulsing signal having an 80% duty cycle (due to the inverting stage 825), will be coupled to line 870 by resistor 822, thus inhibiting charging for 80% of the time and allowing charging whenever line 870 is low. In the embodiment illustrated, the battery is pulsed on for approximately 4 minutes and charging is inhibited for approximately 16 minutes. Transistor 840, inverter 841 and associated components 842, 843 and 844 are provided so as to light LED 845 continuously when the charging circuit enters the pulse mode.

Flip flop 760 is provided so that high current charging can only be initiated if the operator presses momentary contact switch 761. When switch 761 is pressed, momentarily, a logic 0 pulse appears at the input of inverter 762, which input is normally tied high by resistor 765, thus forcing the output of inverter 762 high and setting flip flop 760 after a delay determined by resistor 763 and capacitor 764. Flip flop 760 may be, for example a type CD4013 D flip flop having set/reset inputs. Once the Q output goes high, NAND gate 730 is enabled. A logic 0 will appear at the output of NAND gate 730 and thus a logic 1 at the output of inverter 740 only if the remaining input of NAND gate 730 is also a logic 1, i.e., if the battery temperature does not exceed the thermal threshold temperature. Thus, high current charging can only be initiated if switch 761 is momentarily pressed and the battery temperature is not above the threshold temperature. Additionally, the reset input of flip flop 760 is coupled to the output of NOR gate 770, whose three inputs are coupled, respectively, to the output of automatic reset circuit 1000, the Q output of flip flop 810 and the Q output of counter 750. Thus, flip flop 760 will be reset when counter 750 times out to end the constant current charging mode, thus ensuring that the battery is pulsed at the low current rate during the pulsing mode of operation. Diode 1112 couples the Q output of flip-flop 760 to one input of NAND gate 729, thus ensuring that when switch 761 is pressed, the slow $Q_{14}$ output of counter 720 is no longer coupled to counter 750 (provided the battery temperature does not exceed the threshold).

In order to indicate to the operator that the high current mode has been initiated, operational amplifier 780 is provided. The Q output of flip flop 760 is coupled to the non-inverting input of operational amplifier 780 by resistor 781. Resistors 783 and 784 provide a voltage divider to bias the operational amplifier's non-inverting input to somewhat less than the 12 volt supply voltage. When the Q output goes high, the output voltage of operational amplifier 780 rises, thus turning on LED 785.

It is also to be noted that, should the operator depress switch 761 so as to initiate a fast charge when the battery is hot, and should the battery temperature later decrease below the threshold while being charged at the lower rate, the battery charging circuit will enter the high current charging mode at this later time.

Automatic reset circuit 1000 provides an automatic reset when the battery is removed from the charging apparatus and during initial power on. Reset circuit 1000 comprises inverters 1002, 1005, 1011, 1013, 1014 and associated components. In the illustrated embodiment inverters 1002, 1005 and 1011 may be type ULN2004 Darlington transistor input drivers and inverters 1013 and 1014 may be type CD4093 NAND gates with their inputs coupled. The operation of this circuit is as follows:

When a battery is connected, the output voltage of the charging circuit will drop from its no load value. Typically, the output voltage might drop to around 30 volts for a 20 cell battery, where each cell drops approximately 1.5 volts. This voltage is coupled to Zener diode 1009, but is insufficient to make the diode conduct. Thus, capacitor 1008 does not charge up through resistor 1010 and Zener diode 1009. Therefore, the input of inverter 1011 will be low and the output of 1011 will be high. Resistor 1012 couples the output of inverter 1011 to the inputs of inverting NAND gates 1013 and 1014 and thus a logic 0 level appears at the output of gates 1013 and 1014. When the battery is removed, the battery charger output voltage rises, Zener diode 1009 conducts, capacitor 1008 charges up, the output of inverter 1011 goes low and the output of inverters 1013 and 1014 go high, thus providing a reset signal to flip flop 810, counters 720 and 750 and flip flop 760. (The latter three through their respective OR gates 733, 752 and 770).

When power is first turned on, capacitor 1015 charges up slowly through resistor 1016, thus providing a momentary reset pulse at the output of inverters 1013 and 1014 to reset the above-mentioned components. Diode 1017 is provided for discharging capacitor 1015 through the power supply.

Additional protection is provided so that the output voltage of the charging circuit does not reach very high levels, which can occur when no load is placed on switching mode regulators of this type. Zener diode 680 conducts when the voltage exceeds its Zener voltage through resistors 681 and 624, thus increasing the input voltage on the control input of switching mode regulator controller 610, thus decreasing the output pulse width at terminals 12 and 13 so that the output voltage stays within permissible limits.

The lower leg of reset circuit 1000 is provided in case the battery is removed during the pulsed mode of operation. It is possible for the battery to be removed when charging is inhibited. Thus Zener diode 1009 will not conduct. Accordingly, the battery input is coupled through resistor 1001 to the input of inverter 1002. Capacitor 1003 is provided for transient suppression. The output of inverter 1003 is coupled through resistor 1004 to the input of inverter 1005, the output of which is coupled to the inputs of inverting stages 1013 and 1014. When the battery is connected, the input of inverter 1002 will be high, thus driving its output low. This in turn drives the output of inverter 1005 high, which in turn forces the outputs of invertors 1013 and 1014 low. When the battery is removed, the conditions are reversed and the outputs of inverters 1013 and 1014 go high, resetting the logic circuitry. Diode 1006 is coupled between the input of inverter 1005 and the output of AND gate 820. Diode 1006 thus inhibits the lower leg of circuit 1000 whenever the output of AND gate 820 is low. Thus, whenever the battery is charging, whether in the constant current mode or in the pulsed mode of operation, the output of inverter 1005 will remain high.

An additional improvement might comprise a system inhibit feature whereby a signal from a switch would be generated whenever the battery was disconnected during charging. This system inhibit signal could be fed via logic gates to the inhibit line 870 to turn the current source off as soon as the battery is disconnected, thus preventing potentially hazardous sparks.

In contrast to the circuit shown in FIGS. 2A and 2B, the circuit of FIGS. 3A through 3D includes circuit 1050 for providing an active indication of the charging current mode. In FIGS. 2A and 2B, the display light-emitting diodes are generally coupled to the logic control devices, thus providing a passive indication. In FIGS. 3A through 3D, an active indication is provided by coupling the input of the circuit across current sensing resistor 657.

Circuit 1050 comprises operational amplifiers 1051, 1053 and 1055, which may be type LM324, inverters 1059 and 1061, which may be type ULN2004, and associated components. Two LED's are provided, one for indicating high current charging, 1072, and one for low, 1073.

When high current, approximately 4A, is flowing through resistor 657, a correspondingly high voltage appears at the non-inverting input of operational amplifier 1051 via resistor 1052. Resistors 1062 and 1063 determine the gain of amplifier 1051. An accordingly high voltage appears at the output of amplifier 1051. This voltage is coupled to the non-inverting inputs of operational amplifiers 1053 and 1055, the latter by resistor 1065.

Both operational amplifiers are provided with voltage divider circuits 1066 and 1067 and 1068 and 1069 at their respective inverting inputs which keep these inverting inputs biased at different levels. Operational amplifier 1053 is biased at a higher voltage. The high voltage output of operational amplifier 1051 when the charging circuit is in the high constant current mode will be sufficient to cause operational amplifier to output a high enough voltage to light LED 1072, thus indicating the charging circuit is in the high current mode. Inverter 1061 coupled to the output of inverter 740 keeps the non-inverting input of operational amplifier 1055 in a low state through diode 1072, thus ensuring that LED 1073 does not light up during the high current mode of operation.

When the charging circuit enters the low current mode, the output voltage of operational amplifier 1051 drops sufficiently so that operational amplifier 1053 does not output a sufficiently high voltage to light LED 1072. This voltage is sufficient, however, so that operational amplifier 1055 outputs a sufficient voltage to light LED 1073. During the low current mode, the output of inverter 1061 is high, so that diode 1074 is reversed biased and does not inhibit operational amplifier 1055. Finally, inverter 1059 is provided so as to keep both LED's 1072 and 1073 blanked out when the charging circuit is in the pulsed mode.

The circuit described with reference to FIGS. 3A through 3B thus provides a multi-mode battery charging apparatus, which charges a battery at a first, high constant current rate if switch 761 is depressed, thereafter switching to a lower current rate if the battery becomes overheated or remaining at the higher rate for a predetermined time if the battery temperature does not exceed a temperature at which battery damage could occur. The charging time is determined by counting stages which are clocked at rates which are determined by the charging rate so as to supply substantially the same amount of charge to the battery as if the battery was charged continuously at either one of the constant current rates. After the counting stages have timed out and the battery has been substantially fully charged, a pulsing current is supplied to the battery so as to prevent the battery from self-discharging.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A battery charger comprising:
   controlled current source means which can be coupled to a battery to be charged for sourcing current to said battery and having an inhibiting input for inhibiting the sourcing of current;
   counting means for generating a timing signal which changes from a first state to a second state after a time interval
   means for generating a two-state signal responsive to the temperature of said battery being charged, said signal being in a first state when said battery is below a threshold temperature and being in a second state when said battery is above said threshold temperature, said current source means having a further input for determining, from two different constant current levels, the current sourced by said current source means to said battery, said further input responsive to said two-state signal so as to charge said battery at a first constant current rate when said two-state signal is in said first state and to charge said battery at a second, reduced constant current rate when said two-state signal is in said second state, said battery being substantially fully charged at one of the first, second or combination of the first and second current rates when said timing signal is in said first state; and
   means for generating a pulsing signal;
   said inhibiting input of said current source means responsive to said pulsing signal when said timing signal is in said second state, said current source means delivering a pulsed current to said battery when said timing signal is in said second state so as to keep said battery from self-discharging after said battery is substantially fully charged.

2. The battery charger recited in claim 1, wherein said counting means is responsive to said two-state signal so as to determine the rate at which said counting means counts, whereby said counting means will count at a reduced rate when said two-state signal is in said second state so as to supply substantially the same amount of accumulated charge to said battery as if said two state signal remained in said first state and said battery was being charged at said first constant current rate.

3. The battery charger recited in claim 3 wherein the magnitude of the pulses of said pulsed current is substantially the same as said second reduced constant current rate.

4. A method for charging a battery, comprising the steps of:
   charging said battery in a constant current charging mode, so as to substantially fully charge said battery, including the steps of:
   charging said battery at a first constant current rate;
   generating a timing signal which changes state after a predetermined time interval;
   generating a signal responsive to the temperature of said battery if the temperature of said battery exceeds a predetermined temperature;
   said step of charging at a first constant current rate continuing for said predetermined time interval or until said signal responsive to the temperature is generated, said battery being thereafter charged, if said signal responsive to the temperature is generated, at a reduced constant current rate for a second time interval; and
   charging said battery with a pulsed current after said constant current charging mode has terminated so as to keep said battery from self-discharging after said battery is substantially fully charged.

5. The method recited in claim 4 wherein said predetermined time interval is determined by counting at a first timing rate and said second time interval is determined by counting at a second reduced timing rate.

6. The method recited in claim 4 wherein said step of charging said battery with a pulsed current includes the step of charging said battery with current pulses having a magnitude substantially equal to the magnitude of said reduced constant current rate.

7. The method recited in claim 6 wherein said step of charging said battery with a pulsed current includes the step of charging said battery at equally spaced intervals for approximately 20% of the period of said pulsed current.

8. The method recited in claim 4 wherein said step of charging said battery in a constant current charging mode comprises the step of controlling a linear, continuous current source so as to charge said battery at a constant current rate.

9. The method recited in claim 4 wherein said step of charging said battery in a constant current charging mode comprises the step of controlling a switching mode regulator current source so as to charge said battery at a constant current rate.

10. A battery charger comprising:
controlled current source means which can be coupled to a battery to be charged having a first input for determining the current, from two different constant current levels, sourced by said current source means to said battery and a second input for inhibiting the sourcing of current to said battery;
means for generating a first signal responsive to the temperature of said battery being charged, said signal being in a first state when said battery is below a threshold temperature and being in a second state when said battery is above said threshold temperature;
counting means for generating a second signal which changes from a first state to a second state after a time interval; and
means for generating a pulsing signal responsive to said second signal;
said first input of said current source means responsive to said first signal and said second signal, said second input responsive to said pulsing signal when said second signal is in said second state, said current source means delivering a constant current determined by the state of said first signal when said second signal is in a first state so as to substantially fully charge said battery and delivering a pulsed current to said battery when said second signal is in said second state so as to keep said battery from self-discharging after said battery is substantially fully charged.

11. The battery charger recited in claim 10 wherein said current source means sources current at a first constant current rate when said first signal is in said first state and at a second, reduced constant current rate when said first signal is in said second state.

12. The battery charger recited in claim 11 wherein said counting means is responsive to said first signal so as to determine the rate at which said counting means counts, whereby said counting means will count at a reduced rate when said first signal is in said second state so as to supply substantially the same amount of accumulated charge to said battery as if said two state signal remained in said first state and said battery was being charged at said first constant current rate.

13. The battery charger recited in claim 12 wherein the magnitude of the pulses of said pulsed current is substantially the same as said second reduced constant current rate.

14. The battery charger recited in claim 10 wherein said controlled current source means comprises a linear constant current regulator which delivers a continuous constant current at one of said current levels when said second signal is in said first state.

15. The battery charger recited in claim 10 wherein said controlled current source means comprises a switching mode constant current regulator, said switching mode regulator comprising means for generating a pulsed signal having a pulse width determined by the current drawn by said battery being charged and filter means for filtering said pulsed signal into a substantially constant current.

16. The battery charger recited in claim 15 wherein said means for generating a pulsed signal comprises switch mode regulator control means having out of phase output signals having a duty cycle varying with the current drawn by said battery, switching mode inverter means responsive to said out-of-phase signals for generating said pulsed signal, said pulsed signal comprising repetitive sequences of positive and negative going pulses, and rectifier means receiving said pulsed signal for rectifying said pulsed signal prior to filtering by said filter means.

17. The battery charger recited in claim 10 wherein said counting means comprises: p1 oscillator means for generating a clock signal;
frequency division means coupled to said clock signal for generating dual counting rates; and
gating means responsive to said first signal for selecting one of said two counting rates in dependence on the state of said first signal.

18. The battery charger recited in claim 17, further comprising means for automatically resetting said counting means whenever said battery is uncoupled from said current source means.

19. The battery charger recited in claim 10 wherein said means for generating a pulsing signal comprises frequency division means having an input coupled to said counting means and an output coupled to said second input of said current source means, for generating a pulsing signal so as to inhibit said current source means from sourcing current to said battery for a substantial portion of the period of said pulsing signal.

20. The battery charger recited in claim 19 wherein said pulsing signal inhibits charging of said battery for 80% of the period of said pulsing signal.

21. A method for charging a battery, comprising the steps of:
charging said battery in a constant current charging mode, so as to substantially fully charge said battery, including the steps of:
charging said battery at a first constant current rate;
generating a timing signal by counting at a first timing rate so as to count for a predetermined time interval;
generating a signal responsive to the temperature of said battery if the temperature of said battery exceeds a predetermined temperature;
said step of charging at a first constant current rate continuing for said predetermined time interval or until said signal responsive to the temperature is generated, said battery being thereafter charged, if said signal responsive to the temperature is generated, at a reduced constant current rate for a second time intereval, said second time interval determined by counting at a second reduced timing rate, said second timing rate related to said first timing rate so as to be substantially inversely proportional to the ratio of said first current rate to said reduced current rate; and charging said battery with a pulsed current after said constant current charging mode has terminated so as to keep said battery from self-discharging after said battery is substantially fully charged.

22. The method recited in claim 21 wherein said step of charging said battery with a pulsed current includes the step of charging said battery with current pulses having a magnitude substantially equal to the magnitude of said reduced constant current rate.

23. The method recited in claim 22 wherein said step of charging said battery with a pulsed current includes the step of charging said battery at equally spaced intervals for approximately 20% of the period of said pulsed current.

24. The method recited in claim 21 wherein said step of charging said battery in a constant current charging mode comprises the step of controlling a linear, continuous current source so as to charge said battery at a constant current rate.

25. The method recited in claim 21 wherein said step of charging said battery in a constant current charging mode comprises the step of controlling a switching mode regulator current source so as to charge said battery at a constant current rate.

* * * * *

UNITED STATES PATENT AND TRADEMARK OFFICE
CERTIFICATE OF CORRECTION

PATENT NO.   : 4,554,500

DATED        : November 19, 1985

INVENTOR(S)  : Thomas J. Sokira

It is certified that error appears in the above-identified patent and that said Letters Patent is hereby corrected as shown below:

Col. 3, line 4, delete "stasges 10" and insert --stages 100--.

Col. 4, line 41, change "218 and 219" to --$2^{18}$ and $2^{19}$--.

Col. 4, line 61, change "termal" to --thermal--.

Col. 8, line 16, change "rectifier", second occurrence, to --rectified--.

Col. 8, line 39, change "supplied" to --supplies--.

Col. 8, line 49, change "controler" to --controller--.

Col. 15, line 15, after "amplifier" insert --1053--.

Col. 15, line 69, after "interval" insert --;--.

Col. 16, line 37, change "3", second occurrence, to --2--.

Col. 18, lines 24, 25, after "comprises:" delete "pl oscillator means for generating a clock signal;", and insert therefor as the first subparagraph of claim 17 the following: --oscillator means for generating a clock signal;--.

Col. 18, line 65, delete "intereval" and insert --interval--.

Signed and Sealed this

Third Day of June 1986

[SEAL]

Attest:

DONALD J. QUIGG

Attesting Officer

Commissioner of Patents and Trademarks